Patented May 7, 1935

2,000,004

UNITED STATES PATENT OFFICE 2,000,004

INSECT REPELLENT

Elmer W. Adams, Hammond, Ind., assignor to Standard Oil Company, Chicago, Ill., a corporation of Indiana No Drawing. Application August 26, 1931, Serial No. 559,590

5 Claims. (Cl. 167—30)

This invention relates to a new composition of matter for use as an insectifuge, and it is particularly adapted to combat insect pests such as flies and the like.

I have found that the esters of benzoic acid are very effective as insect repellents; that they do not produce dermatitis; that they may be effectively used as an insectifuge in oil emulsions, oleaginous compositions, mineral oils, and other suitable vehicles. Also the benzoic acid esters may be used in combination with other compositions that exhibit insecticidal and/or insectifugal properties, for example, mineral oil solutions containing pyrethrum and the like.

The benzoic acid esters suitable for use as insect repellents have the following general formula:

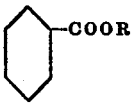

wherein R represents an organic residue; for example, an alkyl radical. Also the benzene ring may be further substituted by hydrocarbon radicals such as ethyl, methyl, isopropyl, etc. without rendering the esters ineffective as repellents.

The repellent effectiveness of the benzoic acid esters has been conclusively established by spraying animals with an oil solution containing a benzoic acid ester of the above general formula and comparing the number of flies on the sprayed animals with the number of flies on the same animals before being sprayed. Also the benzoic acid esters, for example, butyl benzoate and cyclohexyl benzoate, have been compared with other well-known repellents, for example, dibutyl phthalate, and in each test the benzoates have proven to be the superior repellent.

The tests were carried out in the following manner:

The number of flies on ten unsprayed cows was noted and the average number of flies on each cow was taken as a control for the test. Each cow was then sprayed with two ounces of the repellent to be tested, and the number of flies on the ten cows was counted one hour after being sprayed; the average number of flies on each cow was noted for comparison with the control. The following table gives the average results from five of the above tests.

| Composition | Butyl benzoate | Butyl phthalate | Control |
|---|---|---|---|
| | The average number of flies on each cow one hour after spraying | The average number of flies on each cow one hour after spraying | The average number of flies on each unsprayed cow |
| Refined mineral oil solution containing 3% of ester | 3.8 | 4.9 | 39.3 |
| Refined mineral oil solution containing ¼ pound of pyrethrum and 2% of ester | 1.9 | Not tested | 54.7 |
| Refined mineral oil solution containing ¼ pound pyrethrum and 3% of ester | 3.8 | Not tested | 24.8 |

From the above table it is readily seen that the benzoic acid esters and the combination of benzoic acid esters with pyrethrum are very effective as insect repellents. Furthermore the composition comprising a benzoic acid ester and pyrethrum not only acts as an effective repellent but kills substantially all of the flies that come in contact with the spray. Instead of using butyl benzoate, as set forth in the above examples, we may use any of the following esters, or combinations of the following esters: the alkyl benzoates, for example, methyl benzoate, ethyl benzoate, propyl benzoate, n-propyl benzoate, isobutyl benzoate, amyl benzoate and hexyl benzoate; the polymethyleneyl benzoates, for example, cyclohexyl benzoate, and cyclopentyl benzoate.

For the purpose of this invention the benzoates may be dissolved in mineral oils of any desired viscosity or A. P. I. gravity, and the concentration may be varied according to the strength needed for the particular insect or circumstances. If the benzoates are used as insect repellents, white oil, which is a non-irritant, refined oil, preferably having a viscosity from 70 to 90 Saybolt at 100° F., can be used as a suitable vehicle; and the benzoates may be used in concentration from 1 to 10%. Also suitable non-irritant vegetable and animal oils may be used as a vehicle for the insectifuges, for example, whale oil, cotton seed oil and the like. The following compositions have been found to be very effective as a cattle fly repellent.

Example 1

White mineral oil 80 to 85 Saybolt viscosity at 100° F_____ 97%
Butyl benzoate_____ 3%

Also I have found that a quick-acting insecticidal and insectifugal composition can be produced by combining the benzoic acid esters with a mineral oil solution containing the oil soluble principles from pyrethrum flowers.

Example 2

Mineral oil 80 to 85 Saybolt viscosity at 100° F. containing the active principles from ¼ to 2 pounds of pyrethrum flowers per gallon _____ 97%
Butyl benzoate_____ 3%

Instead of using butyl benzoate, as set forth in the above two examples, I may use any of the benzoic acid esters as hereinabove set forth.

The above disclosure represents the best mode of applying the herein described invention, but the concentration of the benzoic acid esters may be varied, and various oils may be used without departing from the scope of the invention.

I claim:

1. An insectifuge comprising a mineral oil solution of an alkyl benzoate, wherein said alkyl group contains from one to six carbon atoms.

2. A composition for spraying cattle and other animals to prevent annoyance by flies and other insects comprising a mineral oil solution of the active principles of pyrethrum flowers and from 1% to 10% of a benzoic acid ester having the general formula $$C_6H_5COOR$$

wherein R stands for an alkyl group containing from one to six carbon atoms.

3. An insectifuge comprising a mineral oil solution of a butyl benzoate.

4. An insectifuge comprising a mineral oil solution of a propyl benzoate.

5. An insectifuge comprising a mineral oil solution of an amyl benzoate.

ELMER W. ADAMS.